July 10, 1928.

H. E. SANDERSON

AUTOMOBILE SIGNAL

Filed July 21, 1927

Inventor

H. E. Sanderson,

By J. Stanley Burch

Attorney

July 10, 1928.
H. E. SANDERSON
AUTOMOBILE SIGNAL
Filed July 21, 1927
1,676,287
2 Sheets-Sheet 2
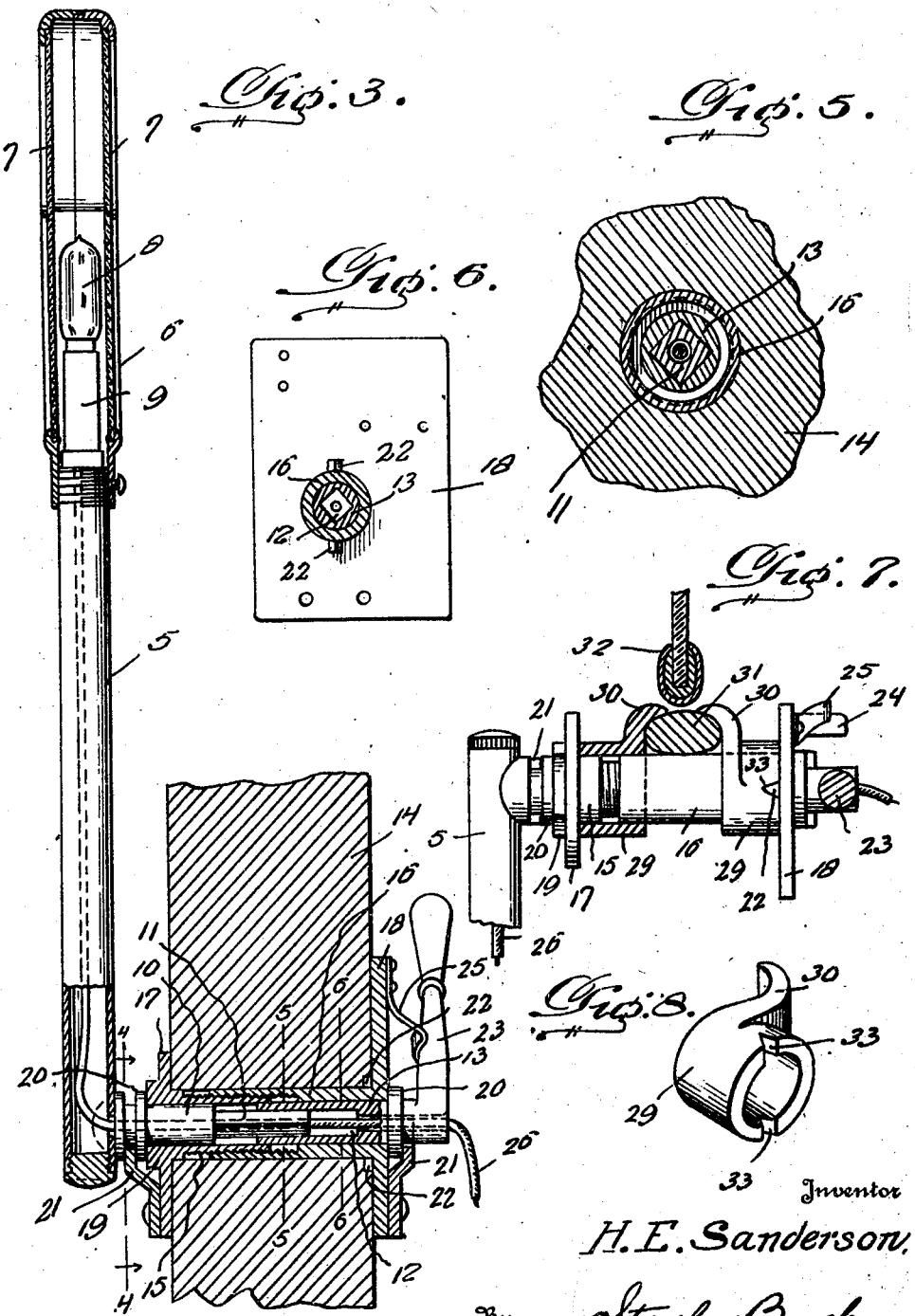

Patented July 10, 1928.

1,676,287

UNITED STATES PATENT OFFICE.

HARLEIGH E. SANDERSON, OF ALVA, OKLAHOMA.

AUTOMOBILE SIGNAL.

Application filed July 21, 1927. Serial No. 207,445.

This invention relates to signals adapted for use upon motor vehicles to give a visible warning of the intention of the driver of the vehicle to stop or change the direction of travel of said vehicle.

The primary object of the invention is to provide an improved signal of the above kind adapted to be readily and effectively mounted upon an automobile of the open or closed type.

A further object is to provide an improved signal of the above kind, including a signal arm adapted to be swung to an upstanding inoperative position, or to a substantially horizontal operative position, and means to limit the swinging movement of said signal arm and to retain it in inoperative position.

The invention further contemplates the provision of various structural details which will insure durability, cheapness in manufacture, convenience in placing the device in use, and ease in operation.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a fragmentary front elevational view of an automobile of the closed type equipped with a signal constructed in accordance with the present invention.

Figure 3 is an enlarged view, partly in side elevation and partly in section, taken substantially on line 3—3 of Figure 1.

Figure 5 is an enlarged section on line 5—5 of Figure 3.

Figure 6 is a section on line 6—6 of Figure 3.

Figure 7 is a view partly in plan and partly in horizontal section, showing the manner of mounting the signal on the side supporting post or upright of the windshield of an automobile of the open type, and Figure 8 is a perspective view of the rear clamping member of the device shown in Figure 7.

Figure 1:
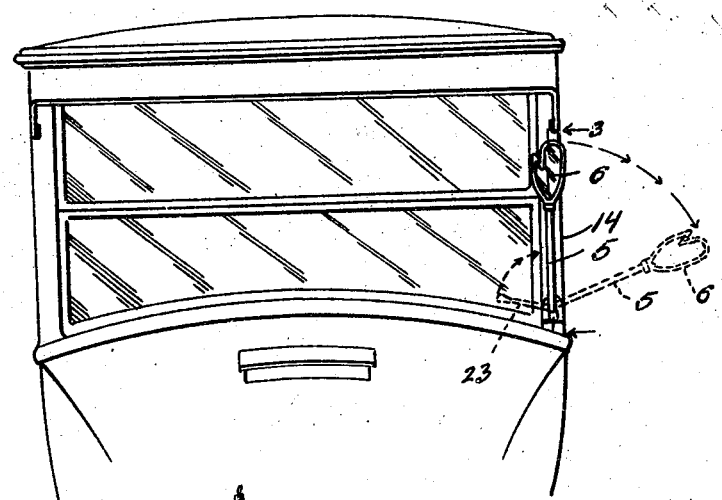
Figure 2:
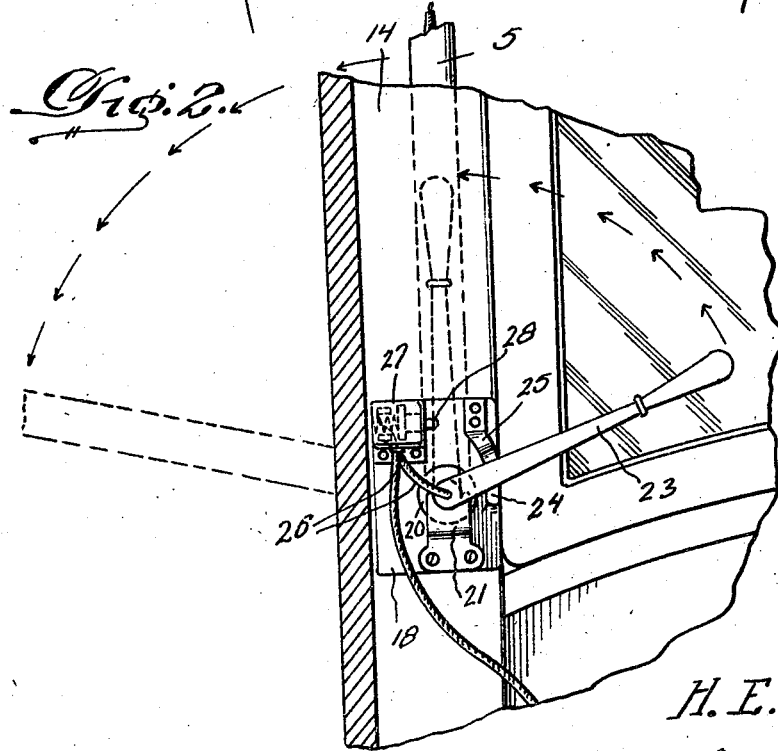
Figure 2 is an enlarged fragmentary transverse section through the automobile.
Figure 4:
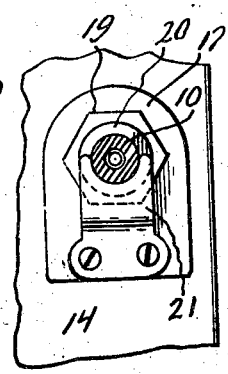
Figure 4 is a section on line 4—4 of Figure 3.

Referring more in detail to the drawings, the embodiment of the invention illustrated includes a hollow arm 5 having a suitably shaped signal lamp 6 secured upon one end thereof, said lamp embodying a flat casing having transparent front and rear sides 7 and adapted to be illuminated, for being readily discerned at night, by means of an incandescent electric lamp 8 mounted in a socket 9 carried by the adjacent end of arm 5 and disposed within the lamp casing 6.

Rigid with and projecting rearwardly from the other end of arm 5 is a shaft section 10 having a reduced polygonal extension 11 slidably fitting in an axial socket 12 of a second shaft section 13. The shaft composed of sections 10 and 13 is adapted to be journaled horizontally in the lower end of the front corner post 14 of the vehicle body, and for this purpose is mounted in a bearing sleeve composed of sections 15 and 16 threaded one into the other so that the bearing sleeve is adjustable in length to accommodate the same to corner posts of different thicknesses. The bearing sleeve is fitted in an opening drilled through the corner post, and the outer ends of the sections thereof are provided with rigid plates 17 and 18 adapted to be brought up tightly against the adjacent surfaces of the corner post when the section 15 is threaded in section 16 by the use of a wrench engaged with the polygonal outer end 19 of said bearing sleeve section 15. The shaft sections are provided near their outer ends with rigid annular flanges 20, and keeper yokes 21 partly embrace the outer ends of the shaft sections outwardly of the flanges 20 to prevent displacement of the shaft sections out of the bearing sleeve sections. Further, when the bearing sleeve is adjusted to draw the plates 17 and 18 against the corner post, the shaft will be shortened correspondingly by reason of the yokes 21 forcing the shaft sections together with the extension 11 moving into the socket 12. In this way, a durable adjustable mounting for the signal arm is provided, and convenient installation of the signal is permitted. To prevent turning of the bearing sleeve, the plate 18 may be provided with V-shaped teeth or ribs 22 adapted to bite into the corner post when the plates are drawn against the latter.

The signal arm is adapted to assume an upstanding inoperative position in front of the corner post and to be swung laterally in an outward and downward direction to a substantially horizontal operative or signalling position, as will be readily understood upon inspection of Figure 1. To enable the driver of the vehicle to operate the signal arm, the rear end of shaft section 13 has a rigid handle 23. Movement of this handle is limited by a stop lug 24 on plate 18 to prevent swinging of the signal arm inwardly past its upstanding inoperative position, and the handle is releasably held by a spring catch 25 on plate 18 to prevent accidental swinging of the signal arm from inoperative to operative position, although permitting manual movement thereof.

Current is supplied to lamp socket 9 by means of an attachment cord or conductors, as generally shown at 26, the latter being extended through an axial passage or bore of the shaft composed of sections 10 and 13, and then upwardly in arm 5. These conductors have a suitable normally open spring actuated switch 27 interposed therein so that the circuit of lamp 8 is open when the signal arm is in raised inoperative position. Switch 27 is fixed on plate 18 and includes an operating element 28 arranged in the path of movement of crank handle 23 so that the switch will be automatically closed and the lamp 8 lighted, when the signal arm is swung to lowered operative position. Current for the lamp may be derived from the storage battery of the vehicle.

To adapt the signal for being mounted upon a vehicle of the open type, a pair of clamping members are provided adapted to be fitted onto the bearing sleeve at the inner sides of plates 17 and 18, as shown in Figures 7 and 8. Each clamping member includes a sleeve 29 adapted to fit on the bearing sleeve and having a rigid lateral jaw 30 adapted to engage the side supporting post or upright 31 of the windshield 32. By adjusting the sections of the bearing sleeve together, the jaws 30 may be caused to firmly grip the post 31 to effectively mount the signal, and to prevent turning of the bearing sleeve, the sleeve 29 of one clamping member has opposed notches 33 in its outer end to receive the teeth 22 of plate 18.

In operation, the signal arm is simply swung from the full line position of Figure 1 to the dotted line position of said figure so as to extend outwardly beyond the adjacent side of the vehicle where it is readily discernible and indicates an intention of the driver to stop or alter the direction of travel of the vehicle.

Minor changes may be made without departing from the spirit and scope of the invention as claimed.

What I claim as new is:—

1. An automobile signal including a signal arm having a rigid lateral supporting shaft at one end adjustable in length and provided with an operating crank handle at one end, and a bearing sleeve for the shaft correspondingly adjustable in length and provided with end clamping plates.

2. An automobile signal including a signal arm having a rigid lateral supporting shaft at one end adjustable in length and provided with an operating crank handle at one end, a bearing sleeve for the shaft correspondingly adjustable in length and provided with end clamping plates, said shaft and bearing sleeve embodying separable sections, and means to prevent displacement of the shaft sections out of the bearing sleeve sections.

3. An automobile signal including a signal arm having a rigid lateral supporting shaft at one end adjustable in length and provided with an operating crank handle at one end, a bearing sleeve for the shaft correspondingly adjustable in length and provided with end clamping plates and inwardly projecting teeth on the inner side of one of said clamping plates.

4. An automobile signal including a signal arm having a lateral shaft at one end adjustable in length and provided with an operating crank handle at one end, a bearing sleeve for the shaft adjustable in length and provided with end clamping plates, inwardly projecting teeth on the inner side of one of said clamping plates, and clamping members including sleeves removably fitted on the bearing sleeve between the clamping plates and having lateral clamping jaws, one of said clamping members having notches in the end of the sleeve thereof for reception of said teeth.

In testimony whereof I affix my signature.

HARLEIGH E. SANDERSON.